United States Patent [19]
Nordine

[11] 3,831,706
[45] Aug. 27, 1974

[54] AUTOMATIC ROW MARKER APPARATUS
[76] Inventor: Clifford A. Nordine, Roosevelt, Minn. 56673
[22] Filed: Jan. 22, 1973
[21] Appl. No.: 325,642

[52] U.S. Cl.................. 180/98, 180/79.1, 172/26
[51] Int. Cl............................................. B62d 5/04
[58] Field of Search......... 180/79, 79.1, 98; 172/26; 46/243; 40/129 C

[56] References Cited
UNITED STATES PATENTS
3,186,493   6/1965   Barry.................................. 172/26
3,472,322   10/1969  Barry............................. 180/79.1 X Primary Examiner—David Schonberg
Assistant Examiner—Terrance L. Siemens
Attorney, Agent, or Firm—Merchant, Gould, Smith & Edell

[57] ABSTRACT

A pair of self-propelled vehicles are positioned in spaced apart alignment on a field to establish a line of sight for an operator along an initial path of travel of a manually operated powered farm implement. Each of the self-propelled vehicles includes an electrically driven motor connected to a source of power for imparting movement to the self-propelled vehicle. Electrical controls, including a control device, are provided for independently actuating the electrically driven motor of each of the self-powered vehicles, in a selected sequence to impart movement to the self-propelled vehicle in a direction perpendicular to the line of sight to establish a subsequent line of sight. A regulating device on each vehicle deactuates the motor to regulate the length of movement of the vehicle.

11 Claims, 7 Drawing Figures

FIG. 7
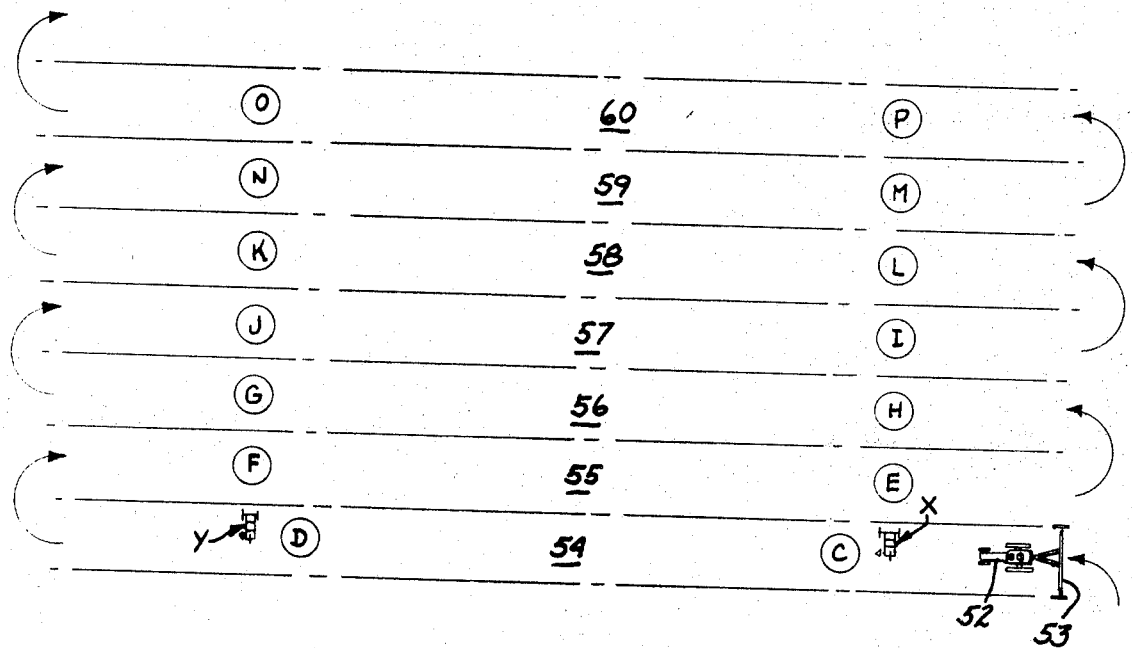
FIG. 4
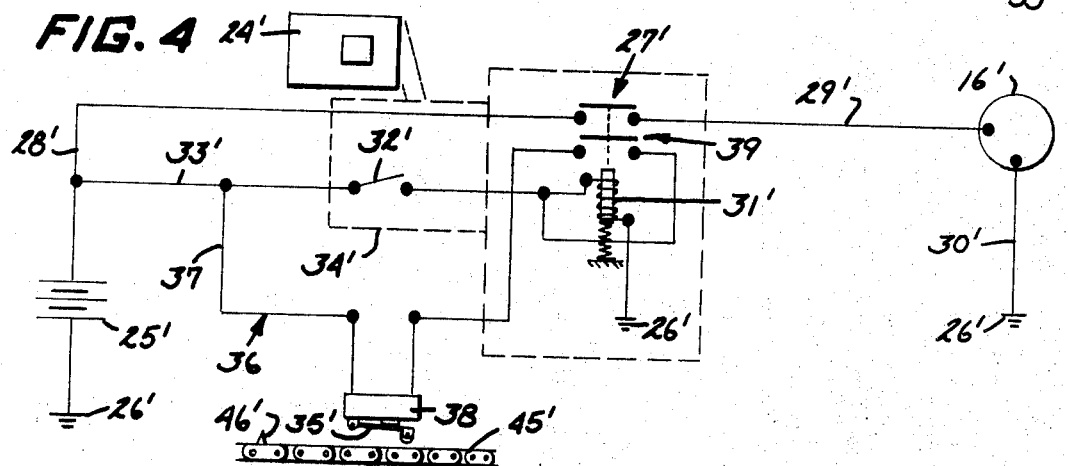
FIG. 5
FIG. 6
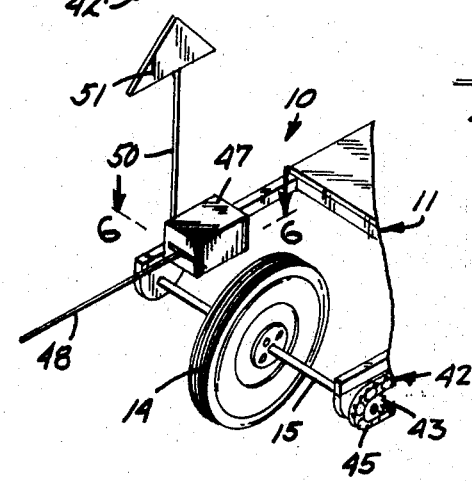

AUTOMATIC ROW MARKER APPARATUS

BACKGROUND OF THE INVENTION

This invention relates generally to farm implements and more specifically relates to an automatic row marker apparatus for guiding a powered farm implement in a path of travel as it traverses a field.

Present farming economics have resulted in larger farms and in farming operations which span somewhat greater land areas. As a result, individual crops or fields likewise cover great expanses of land. In order to overcome the high cost of planting and harvesting operations, as well as herbicide or fertilizer applications between such operations, it has been necessary for manufacturers to provide farm implements which perform multiple functions, such as combined seed drilling and fertilizing, for example. In addition, farm implements have been manufactured with increased width dimensions as well as special hook-ups which permit ganged or grouped operation so as to cover an extremely large area with every pass of the implement over a field. This increased size and the ganged operation of farm implements have made it exceedingly difficult for operators thereof to judge correct spacing of the side of the implement relative to a preceding path of travel. Even more difficult is the problem of judging position when spraying or fertilizing a field, especially after crops are growing. There is no good way to mark such a field. It will be appreciated that these situations result in much overlapping or in unworked spaces between adjacent rows, neither of which is conducive to good farming practice.

SUMMARY OF THE INVENTION

The present invention has for its primary object the provision of automatic marking apparatus which is adaptable to guide a manually operated powered farm implement as it traverses a field regardless of the size of the field or the extent of growth of the crop.

Another object of the present invention is the provision of a device of the class above described which requires a minimum of the operator's time and effort to position and use.

A still further object of the invention is the provision of a device of the class described which is easily adaptable to guide farm implements of various width dimensions.

The present invention provides an automatic row marker apparatus which preferably includes a pair of spaced apart self-propelled vehicles positioned in alignment to establish an initial line of sight along the path of travel of a manually operated powered farm implement as it traverses a field. Each of the self-propelled vehicles includes an elongated wheel-equipped frame having an electrically driven motor thereon to impart movements to the wheel-equipped frame, the wheel-equipped frame being positioned to move in a direction perpendicular to the line of sight. A reference member extends vertically upwardly from the wheel-equipped frame to aid in establishing the line of sight. A remote control device controls electrical circuitry on each of the wheel-equipped frames from the powered farm implement to independently actuate a respective electrically driven motor in a selected sequence to establish a subsequent line of sight spaced from and generally parallel to a preceding line of sight. A regulating apparatus mounted on each of the wheel-equipped frames cooperates with associated electrical circuitry to deactivate the motor and regulate the length of the movements of the vehicle.

BRIEF DESCRIPTION OF THE DRAWINGS

Referring to the drawings, wherein like characters indicate like parts throughout the views:

FIG. 4 is a view similar to FIG. 3 showing alternate electrical circuitry for controlling the drive mechanism of the structure of FIG. 1;

FIG. 5 is a fragmentary view in perspective of a portion of FIG. 1 illustrating a still further apparatus for controlling the drive mechanism of FIG. 1;

FIG. 6 is a horizontal sectional view as seen from the line 6—6 of FIG. 5; and

FIG. 7 is a diagrammatic plan view illustrating a method of utilizing the apparatus of FIG. 1 to guide a manually operated powered farm implement as it traverses a field.

DETAILED DESCRIPTION OF THE PREFERRED EMBODIMENT

Figure 1:
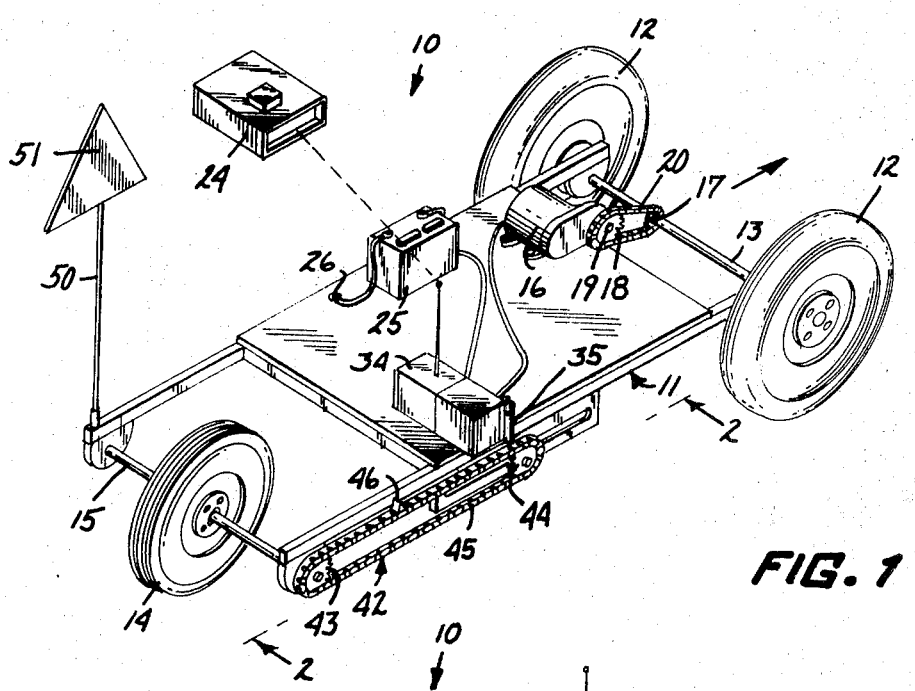
FIG. 1 is a view in perspective of a row marking apparatus construction in accordance with the present invention.
Figure 2:
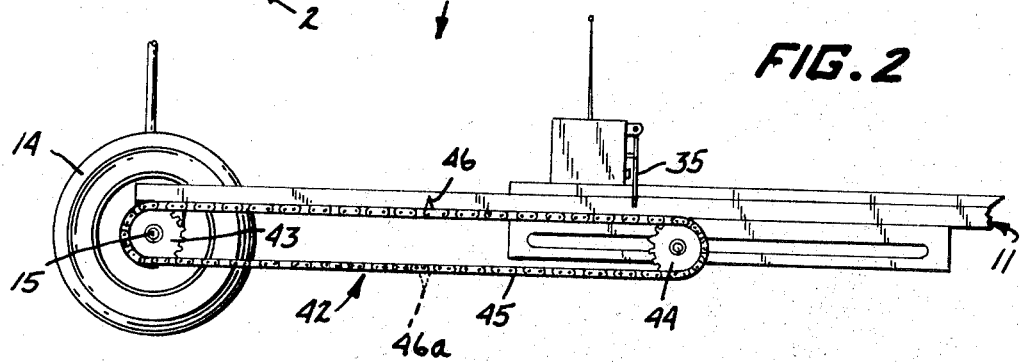
FIG. 2 is an enlarged fragmentary view in side elevation as seen generally from the line 2—2 of FIG. 1.
Figure 3:
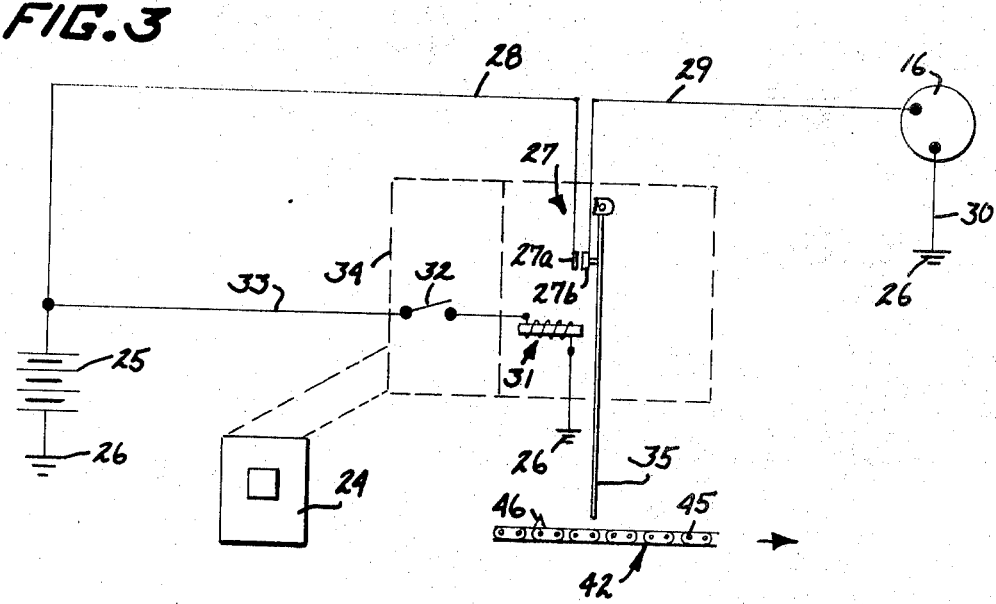
FIG. 3 is a schematic diagram of electrical circuitry utilized to control the drive mechanism of the structure of FIG. 1.

Referring to the drawings, and initially to FIGS. 1–3, there is shown a self-propelled vehicle, indicated generally by the numeral 10, utilized as automatic row marker apparatus for aiding the operator in guiding a manually operated powered farm implement in a path of travel along a predetermined line of sight.

Self-propelled vehicle 10 includes an elongated wheel-equipped frame 11 having a pair of wheels 12 mounted on one end thereof for common rotation by means of axle member 13. A third wheel 14 is mounted for rotation by means of axle 15, on an opposite end of frame 11 to support the frame 11 for movements over an underlying surface.

The axles 13, 15 are mounted for rotation on parallel axes to control the direction of movement of the frame 11. Power means for imparting such movements to the wheel-equipped frame 11 include an electrically driven motor 16 mounted on the frame 11. A pair of sprockets 17, 18 respectively mounted on the axle 13 and output shaft 19 of the motor 16 have a link chain 20 entrained thereover to transmit power from the motor 16 to the wheels 12.

Control means for actuating the motor 16 to impart movement to the vehicle 10 include a conventional battery powered remote control device 24 and a source of electrical power for the motor 16 in the nature of a storage battery 25. FIG. 3 of the drawings is a schematic diagram of one form of electrical circuitry utilized to actuate the motor 16. As shown, the circuitry of FIG. 3 includes the storage battery 25 having one terminal thereof connected to ground 26 and the other terminal thereof connected to one contact 27a of a first normally open switch 27 by means of a conductor 28. A movable contact 27b of normally open switch 27 is connected to one terminal of the motor 16 by a conductor 29, and motor 16 is connected to ground 26 by conductor 30. Means for moving the first electrical switch 27 between its normally open condition and a closed condition wherein the electrically driven motor 16 is energized by the storage battery 25 includes an electro-magnetic device 31 and a normally open second switch 32 operatively mounted within a housing 34 to be momentarily closed by a signal from the remote control device 24. A conductor 33, connected to the device 31, forms a series connection from battery 25 to ground 26 through the electro-magnetic device 31 and switch 32. Remote control device 24, together with a signal receiving mechanism contained within housing 34 are conventional in nature and are of a type such as those presently employed in mechanisms for opening and closing garage doors. Inasmuch as the remote control device (transmitter) 24 and signal receiving apparatus 34 are conventional in nature, it is believed that only a diagrammatic showing thereof is necessary to adequately explain the operation of the circuitry of FIG. 3 to one skilled in the art. Thus, momentarily closing the normally open switch 32, by means of a signal emanating from the remote control device 24 and received by the receiver mechanism 34, momentarily energizes the electromagnetic device 31.

An actuating lever 35 is pivotally mounted to be magnetically attracted when the electromagnetic device 31 is momentarily energized. When the actuating lever 35 is magnetically attracted to the electromagnetic device 31, the electrical contacts 27a, 27b of the switch 27 are closed to complete the circuit between the battery 25 and motor 16, whereupon the motor 16 imparts movements to the self-propelled vehicle 10. Since the second switch 32 is only momentarily closed, the electromagnetic device 31 is only momentarily energized to attract the actuating lever 35. However, residual magnetism in the electromagnetic device 31 maintains the actuating lever 35 in a position to hold the contacts 27a, 27b of the first electrical switch 27 in their closed condition and the electrically driven motor 16 energized.

FIG. 4 of the drawings illustrates a circuit diagram generally similar to that shown in FIG. 3 and like parts thereof are indicated by like numerals with a prime mark added. Specifically, the circuit of FIG. 4 differs from that of FIG. 3 in that the means for moving the first electrical switch 27' between its normally open condition and a closed condition includes an electromagnetic device in the form of a solenoid 31' and a holding circuit 36. As shown, holding circuit 36 is connected in parallel with second normally open switch 32' and includes electrical conductor 37 having a series connected normally closed microswitch 38 and a normally open holding switch 39. Holding switch 39 is operably mounted to be closed by energization of solenoid 31' upon momentary closing of the second electrical switch 32'. Thus, when switch 32' is momentarily closed by the remote control device 24' and signal receiving mechanism 34', solenoid 31' is energized to operate and close first switch 27' to complete the circuit to the motor 16'.

Initial energization of the solenoid 31' also closes switch 39 so that holding circuit 36 may bypass momentarily closed switch 32' and maintain the solenoid 31' in an energized state with the switch 27' closed. In both of the circuit diagrams shown in FIGS. 3 and 4, the motor 16 or 16' is maintained in an actuated condition until regulating means, indicated generally by the numeral 42, is employed to open the circuit to the motor. As seen particularly in FIG. 2 of the drawings, regulating means 42 includes rotating means in the nature of a first sprocket member 43 fixedly mounted on the axle 15 for common rotation with the third wheel 14. A second sprocket member 44 is adjustably mounted for rotation on the wheel-equipped frame 11. A link chain 45 is entrained over the sprocket members 43, 44. A cam 46 is mounted on the link chain 45 for movement therewith to deactuate the electrically driven motor 16, as will presently be described. For purposes of explanation, a single cam element 46 is rigidly fixed to the chain 45. However, chain 45 may be divided into equal segments by additional cams 46 (shown by dotted lines), the sprocket 44 adjusted to a different position and link chain 45 varied in length, or the size of sprocket 43 changed to regulate the length of time the electrically driven motor 16 is energized and thus, the length of movements of the self-propelled vehicle 10. In any event, a cam or cams 46 move with the link chain 45 when the wheel 15 rotates until the actuating lever 35 is engaged to overcomes the residual magnetism of the electromagnetic device 31, causing lever 35 to move to its normal position shown in FIG. 3. At this time, the contacts 27a, 27b of the first electrical switch 27 return to a normally open condition and motor 16 is deenergized to terminate movement of the vehicle 10. Because of vehicle momentum, a slight over-ride occurs in the mechanism of the self-propelled vehicle 10 to disengage the cam 46 from the actuating lever 35, thereby permitting subsequent operation of the circuit.

In the control means 23' of FIG. 4, cam means 46' engages actuating lever 35' of microswitch 38 to cause momentary interruption in the holding circuit 36 by moving the contacts of switch 38 to an open condition, thereby deenergizing the solenoid 31. Deenergization of the solenoid 31 returns the switch 27' to its normally open condition and switch 39 to an open condition wherein motor 16' is deactuated and holding circuit 36 is returned to a ready state for subsequent operations. A slight over-ride of the cam 46', due to momentum of the vehicle 10, returns the contacts of switch 38 to their normally closed condition. However, even if the over-ride does not occur, momentary closing of the switch 32' will energize the motor 16' causing the cam 46' to move and switch 38 to return to its closed condition.

FIGS. 5 and 6 of the drawings illustrate a further embodiment of the present invention illustrated in FIGS. 1 and 2. Inasmuch as parts thereof are generally similar to parts of the structure shown in FIGS. 1 and 2, like reference characters will indicate like parts. In the embodiment illustrated in FIGS. 5, 6, normally open switch 32 is contained within a housing 47 mounted on the frame 11. A lever 48 is pivotally mounted in the housing 47 in a manner to physically engage switch 32 and close the contacts thereof. Lever 48 is spring biased in a direction away from the switch 32 by means of a coil compression spring 49. With this arrangement of parts, motor 16 may be actuated by physically engaging the lever 48 to close the switch 32 and energize the electromagnetic device. Vehicle 10 may thus be advanced by physical contact with the farm implement instead of by radio, to move the predetermined distance.

Although any point on the self-propelled vehicle 10 may be used as a reference point to establish a line of sight, a vertically extended reference member 50 is provided for an operator's convenience. The upper end of the reference member 50 is equipped with a flag or the like 51 which aids the operator in sighting in on the reference member 50. It will be appreciated that vertically extending the reference member 50 facilitates the use of the self-propelled vehicle 10 for establishing a line of sight when it is desired to apply herbicides or the like to crops which have grown to a height which would normally prevent an operator from seeing the vehicle 10. Also, such reference member 50 aids in sighting in on the vehicle 10 in situations where the terrain is uneven.

Referring specifically to FIG. 7 of the drawings there is illustrated one method in which the above-described vehicle 10 may be utilized to guide a tractor and sprayer indicated at 52, 53 respectively. While other methods of utilizing the vehicle may be devised, this is perhaps the most typical. As shown, a pair of vehicles 10 (hereinafter referred to as vehicle X and vehicle Y are positioned spaced apart from each other on a field to be worked as at positions C and D. Vehicles X and Y are aligned at C and D to establish a line of sight along an initial path of travel 54 of the tractor 52. When the initial path of travel 54 has been determined, the operator of vehicle 52 actuates motor 16, 16' of vehicle X by use of the remote control device 24, 24'. Movement is thus imparted to the vehicle X to move it in a direction perpendicular to the previous line of sight to position E to aid in establishing a subsequent line of sight spaced from and generally parallel to a preceding line of sight to direct the operator along a subsequent path of travel 55. Cam members 46, 46' determine the length of travel of vehicle X between the positions C, E by engaging lever 35, 35' to deenergize the electromagnetic device 31, 31' and thus deactivate the motor 16, 16'. When the vehicle X has been moved to position E the tractor 52 and sprayer 53 proceed along the path of travel 54 (guided by the reference member 50 and flag 51 of vehicle Y) until such tractor 52 is in close proximity to the vehicle Y. At this time, electrically driven motor 16, 16' of vehicle Y is actuated and vehicle Y moves in a direction perpendicular to the initial line of sight to establish, with vehicle X, a subsequent line of sight spaced from and generally parallel to the preceding line of sight to define the subsequent path of travel 55 for the vehicle 52 and sprayer 53. The distance vehicle Y moves from position D to position F is determined by the cam 46, 46', such cam 46, 46' of vehicle Y normally being identically spaced with respect to the cams 46, 46' of vehicle X so that the vehicles move in equal distance each time they are actuated. When vehicle X has been moved from position D to position F, tractor 52 and sprayer 53 proceed beyond such position D and make a 180° turn, whereupon, the operator may again line up the tractor 52 and sprayer 53 with the reference members 50 of vehicles X and Y to guide him in his travel along the subsequent path of travel 55. As the turn is completed and vehicle Y is approached in position F, the operator again actuates motor 16, 16' to move vehicle Y to position G to aid in establishing a line of sight for a subsequent path of travel 56. The distance the vehicle moves from position F to position G is again determined by the cam 46, 46' engaging lever 35, 35' to deactivate the motor 16, 16'. Tractor 52 then proceeds along path of travel 55, guided by the reference member 50 of vehicle X in position E. To establish the subsequent paths of travel represented by the additional numbers 56–60, the vehicles X, Y are moved in the sequence illustrated by the reference letters H-P.

While I have described and illustrated a method of utilizing only a pair of vehicles X and Y, it will be recognized by those skilled in the art that in larger fields or in fields of uneven terrain characteristics, other vehicles 10 may be positioned between the vehicles X and Y to aid in establishing a line of sight to guide the tractor 52 along the paths of travel 54–60. In any event, regardless of the number of vehicles 10 which may be utilized in a particular path of travel 54–60, each thereof has its electrically driven motor 16, 16' actuated as the tractor 52 approaches a given one of the vehicles 10 in its travel along the paths of travel 54–60. Also, on occasion, it may be desirable to utilize but a single one of the vehicles 10. This is accomplished by placing the vehicle 10 generally in the center of a field and energizing the motor 16, 16' as above described to mark a subsequent path of travel for the vehicle as it traverses the field. In addition, while I have described the operation of the present invention in connection with a farm implement such as the tractor 52 and sprayer 53, it will be appreciated that other farm implements (for example air-borne spraying units) may utilize the present device with similar results.

While specific embodiments of an automatic row marker apparatus are illustrated and described, it should be understood that further modifications and improvements will occur to those skilled in the art. I desire it to be understood, therefore, that this invention is not limited to the particular structures shown, and I intend in the appended claims to cover all modifications which do not depart from the spirit and scope of this invention.

What is claimed is:

1. A method of guiding a manually operated powered farm implement in a path of travel comprising the steps of:
   a. positioning at least a pair of self-propelled vehicles carrying omnidirectionally visible signals on a field, spaced mutually in the desired direction of travel of the implement, for independent movement generally perpendicular to said desired direction;
   b. aligning said self-propelled vehicles to establish a line of sight along an initial path of travel for the operator of the manually operated powered farm implement;
   c. controlling said vehicles separately from the powered farm implement to cause said independent movement thereof through predetermined distances and in the selected sequence to establish a subsequent line of sight spaced from and generally parallel to the preceding line of sight; and
   d. regulating the length of said movements perpendicular to the preceding line of sight on each of said self-propelled vehicles.

2. The method of claim 1 with the additional step of directing the movement of the implement in accordance with successive lines of sight so established.

3. Apparatus for use in identifying the locations of rows to be followed by the operator of a farm implement comprising, in combination:
   a. a vehicle arranged for trackless movement along a predetermined line generally perpendicular to the desired direction of the rows;
   b. an omnidirectionally visible reference member carried by said vehicle for cooperation with at least one other similar member to define a line of sight identifying a row to be followed;

c. power means on said vehicle energizable to propel the vehicle along said predetermined line;
d. means actuable by the operator of the implement to give a signal for controlling the vehicle;
e. control means on said vehicle for causing energization of the power means in response to said signal;
f. and regulating means on said vehicle, responsive to distance traveled thereby, for causing deenergization of the power means of said vehicle after it has traveled a predetermined distance.

4. Apparatus for use in identifying the location of rows to be followed by the operator of a farm implement, comprising, in combination:
a. a plurality of vehicles spaced in the desired direction of said rows, and arranged for trackless movement along predetermined lines generally perpendicular to said desired direction;
b. omnidirectionally visible reference means carried by said vehicles for jointly defining a line of sight identifying a row to be followed;
c. power means on each vehicle energizable to propel the vehicle along its predetermined line;
d. means actuable by the operator of the implement to give signals for controlling the vehicles independently;
e. control means on said vehicles for severally causing energization of the power means on said vehicles in response to different ones of said signals;
f. and regulating means on each vehicle, responsive to distance traveled thereby, for causing deenergization of the power means on said vehicle after it has been propelled a predetermined distance.

5. Apparatus according to claim 4 which includes means actuated out of a normal state by momentary operation of said control means, and returned to said normal state by momentary operation of said regulating means.

6. Apparatus according to claim 5 in which said means is actuated out of said normal state by an electromagnetic device and is retained out of said normal state by a holding circuit associated with said device.

7. Apparatus according to claim 4 which includes a member actuated out of a normal position by momentary operation of said control means, and returned to said normal position by momentary operation of said regulating means.

8. Apparatus according to claim 7 in which the vehicle includes at least one ground contacting wheel, and in which the regulating means includes a chain driven by said wheel past said member and cam means mounted on said chain for engaging said member to return it to said normal position, so that the distance traveled by the vehicle is determined by the length of said chain.

9. Apparatus according to claim 8 together with an idler for said chain and means for adjusting the position of said idler to cooperate with chains of different lengths.

10. Apparatus according to claim 7 in which said member is actuated out of said normal position by an electromagnetic device and is retained out of said normal state by residual magnetism in said device.

11. Apparatus for use in identifying the location of rows to be followed by the operator of a farm implement, comprising, in combination:
a. means actuable by the operator of the implement to give a plurality of remotely distinguishable control signals;
b. a plurality of spaced vehicles remote from the implement and arranged for trackless movement along predetermined lines generally perpendicular to the desired direction of the row;
c. omnidirectionally visible reference members carried by said vehicles for jointly defining a line of sight identifying the location of a desired row;
d. power means on each said vehicle energizable to propel the vehicle along said predetermined line;
e. control means on said vehicles for severally causing energization of the power means on said vehicles in response to different ones of said signals;
f. and regulating means on said vehicle responsive to distance traveled thereby, for causing deenergization of the power means of said vehicle after it has been propelled a predetermined distance.

* * * * *